9178X
W. R. Nivens,
Cracker Machine,
Patented Oct. 17, 1835.
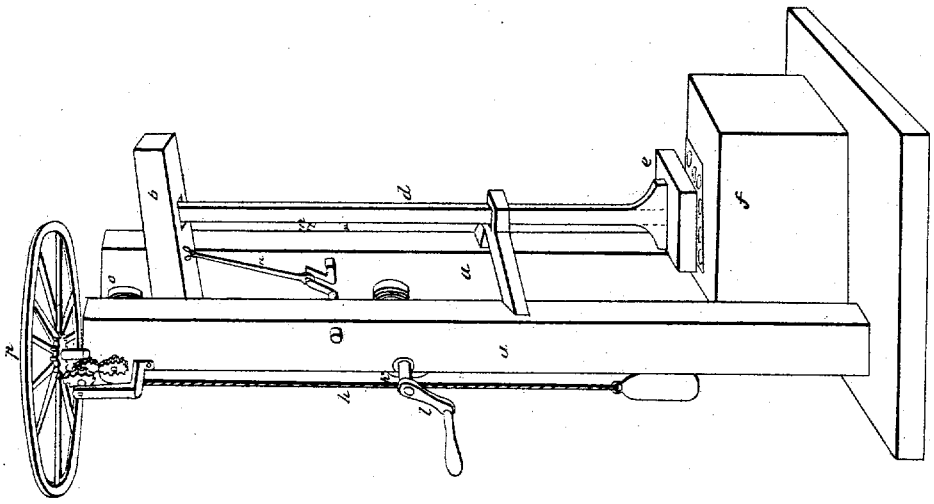
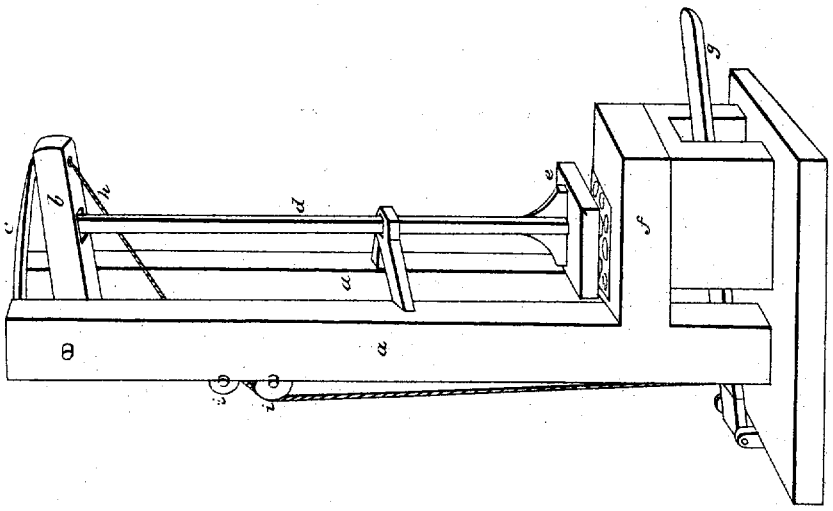
N. PETERS, PHOTO-LITHOGRAPHER, WASHINGTON, D. C.

William R. Nivens of New York City
Letters Patent

The Schedule referred to in these Letters Patent and making part of the same containing a description in the words of the said William R. Nivens himself of his improvement in the machine for cutting crackers and Biscuits To all to whom these presents shall come. Be it known that I William R. Nivens of the City, County and State of New York have invented a new and useful improvement in the construction of machinery for operating and cutting crackers ~~and~~ or Soda Biscuits, and that the following is a full and exact description of the construction and operation of the said machine, as invented and improved by me, The constituent parts of the above mentioned machine are as follows. First a perpendicular frame is made of two posts, each about eight inches wide, and about six inches thick. and about eight feet high: or of any other suitable stuff as may be necessary to make the said frame to any suitable size. near the top of said frame and in the centre is a horizontal lever with one end fastened in the same extending in front about eighteen inches attached to a horizontal spring about the same length, the one end of said spring is fastened on the top of said frame directly above said lever. about through the centre of the said lever is a mortice and in said mortice is fastened a perpendicular rod extending downwards about four feet, guided in its position by a guard fastened in said frame which said rod passes through and at the lower end of said rod is attached the cracker or Soda Biscuit cutters made of some sufficient metal. To cut the ordinary size of Crackers or Soda Biscuit from seven to thirteen at one evolution or any suitable number as may be necessary. Directly under the bottom of said cutters in said frame is attached a horizontal cutting

9178X block about eighteen inches square and of proportional thickness made
of suitable metal near the lower end of said frame is a foot board
in the front eighteen inches long. and at the back is fastened a rope
strap, or chain, extending upwards over the pulleys on the
backside of said frame, then passing through the centre of said
frame in front directly under and through said horizontal lever
passing on the top of the same and fastened at the end in front
where the aforesaid horizontal spring is fastened to said lever
and by the operator with one foot on said foot board in front
of said machine causes a quick motion through said machine And if necessary to use the Clock motion on said machine
a drum is to be placed where the lower pulley is running on an
axle which passes through said frame, at one end of which will
be affixed (a rag wheel and ratchet, and hand crank to wind
up the said machine. On the said same axle, will be attached
one wheel above said wheel is a cog wheel running on an ax
el to which a connecting rod is attached to the same axel
with a crank on said axel not using the aforesaid horizontal
spring. Near the top of said frame is a small drum that the
cord passes twice round, on said cord is a weight that sets the
said machine in motion on the axel that the drum runs on is
a wheel and pinion. and above that is fastened an axel and
bevel wheel and pinnion that sets the fly wheel in motion,
and if necessary to set two Rollers in operation it will roll
the dough to itself, and by Rolling the dough it is calculated
to have a portable table to deliver the biscuits from said ma
chine my particular claim in my improvement is this move
ment of said machine being entirely different from any other
hitherto known Witnesses
Caleb Anguvine
James Rummage William R. Stivens (165 words) (Patented 17 [illegible] 1835)

[illegible]